United States Patent [19]

Winyall

[11] 4,216,113
[45] Aug. 5, 1980

[54] PROCESS FOR PREPARING THICKENING GRADE OF SILICA AND PROCESS OF USING SAME

[75] Inventor: Milton E. Winyall, Columbia, Md.

[73] Assignee: W. R. Grace & Co., New York, N.Y.

[21] Appl. No.: 324,711

[22] Filed: Jan. 18, 1973

Related U.S. Application Data

[63] Continuation-in-part of Ser. No. 184,906, Sep. 29, 1971, abandoned.

[51] Int. Cl.³ ............................................. B01J 13/00
[52] U.S. Cl. ................................... 252/317; 252/28; 252/309; 260/40 R
[58] Field of Search ......................... 252/317, 309, 28; 260/40 R

[56] References Cited

U.S. PATENT DOCUMENTS

| | | | |
|---|---|---|---|
| 2,396,051 | 3/1946 | Laus | 252/317 X |
| 2,474,910 | 7/1949 | Pierce et al. | 252/448 |
| 2,692,863 | 10/1954 | Iler | 252/309 |
| 2,856,268 | 10/1958 | Young | 252/317 UX |
| 3,004,921 | 10/1961 | Stossel | 252/309 |
| 3,185,301 | 5/1965 | Folkins et al. | |
| 3,574,135 | 4/1971 | Sampson et al. | 252/317 |

Primary Examiner—Richard D. Lovering
Attorney, Agent, or Firm—Michael J. McGreal

[57] ABSTRACT

This invention consists in the exchanging of the water of a silica hydrogel with a water miscible organic solvent to a water content of less than 10 percent by weight, and then feeding this organogel to a fluid energy mill for concurrent drying and deagglomerating.

15 Claims, No Drawings

PROCESS FOR PREPARING THICKENING GRADE OF SILICA AND PROCESS OF USING SAME

This is a continuation-in-part application of U.S. Ser. No. 184,906, which was filed Sept. 29, 1971 now abandoned.

This invention relates to improved fine sized silica thickening agents. In a more particular way, it relates to fine-sized, low density gels and precipitates of silica which, when added to organic liquids such as oils or resins, increases the viscosity of these liquids.

Silica, to be an effective thickening agent in organic liquids, must be of a fine size. By fine size is meant that the silica must be in a particle size range of less than 100 millimicrons. These silica materials may either initially be of this small particle size, or be capable of being easily deaggregated or disintegrated to this small particle size when mixed into the liquid to be thickened. Up to this time very useful silica thickeners have generally been produced by pyrogenic techniques. These silicas, designated in the art as pyrogenic silicas, are the thermal decomposition product of silica tetrachloride. A prime characteristic of these pyrogenic silica materials is that they are loosely aggregated to about a 0.5 to 5 micron size, but which when mixed into an organic liquid readily deaggregate to less than 100 millimicron sized particles.

Silica thickening agents have also been produced by aerogel processes. This consists usually of heating a silica hydrogel wherein most of the water has been exchanged with an organic solvent such as ethanol to above the critical temperature of the organic solvent, at which point the pressure is released and a dried silica is recovered in the size range of 0.5 to 5 microns and can be deaggregated to a degree when mixed in the organic medium which it is to thicken. Generally, these are not as good in thickening organic liquids as pyrogenic silicas.

The present invention provides a new method of producing silica thickening agents. In the processes of this method, a silica hydrogel is treated with an organic exchange liquid so as to remove at least part of the water from the hydrogel, followed by feeding of this partially exchanged silica to a fluid energy mill for concurrent drying and deaggregating. The product from the fluid energy mill is a loosely aggregated silica of a particle size range of 0.5 to 5 microns. When this silica is added to an organic medium such as an oil or resin it is readily deaggregated under conventional mixing to particle sizes of less than 100 millimicrons. This loosely aggregated silica exhibits very good thickening properties, and particularly in regard to polyester resins.

The significant advantage of the processes of this invention over those currently practiced are their simplicity and inherently lower cost. The concurrent drying and deaggregating in the fluid energy mill is very economical. Also, the organic exchange liquid can be easily recovered and recycled to the stage of partial water replacement in the hydrogel.

It is, therefore, a prime object of this invention to produce silica thickeners from silica hydrogels by a technique of at least partial water exchange from the hydrogel using an organic liquid, followed by a concurrent drying and deaggregating of the silica in a fluid energy mill.

It is also an object of this invention to provide useful, low cost silica thickening agents.

It is further an object of this invention to provide silica products in a size range of 0.5 to 5 microns, which are loosely aggregated, so that when blended into an organic media using conventional mixing the silica is deaggregated to less than 100 millimicron size particles and is readily dispersed.

Broadly, this invention sets out new processes for producing silica thickening agents. Silica hydrogels which are the essential precursor materials of this invention can be produced by any of a myriad number of techniques. These may be either acid or alkaline set silica hydrogels, and may be produced by bulk or slurry techniques. That is, these silica hydrogels may be produced by adding an acid such as sulfuric to an alkali silicate solution such as sodium silicate, to form a silica hydrogel solution which then converts with or without the further addition of acid to form a silica hydrogel, or these silica hydrogels may also be produced by the addition of a weak acid such as carbon dioxide to an alkali silicate such as sodium silicate solution to form a silica hydrogel. The pH of the hydrogel after the complete addition of sulfuric acid or carbon dioxide to neutralize any alkali ion is in the range of about 3 to 10. The silica hydrogel can then be washed by any known technique such as by sequential contactings with acidified water and water. The acidified water is usually about a 1 to 4 pH aqueous sulfuric acid solution. These wash solutions may range in temperature from about 10° C. to 100° C.

There are many other techniques for producing silica hydrogels useful in this invention. Sulfuric acid, although the preferred acid in most processes, may be replaced with some other strong acid such as hydrochloric, nitric or phosphoric acid, or with a gaseous acid anhydride such as sulfur dioxide. Similarly, carbon dioxide may be replaced by some other weakly acidic material. Further, on conversion from the silica hydrosol to the silica hydrogel, the media may be maintained under vigorous agitation to produce small slurry particles, that is, slurry set, or the silica hydrosol may be allowed to convert to the silica hydrogel without any agitation, with the resulting product being a larger particle size silica hydrogel, that is, bulk set.

Essentially any of these operational techniques produces useful silica hydrogels for the processes of this invention. The processes and products of this invention are not restricted to any particular silica hydrogel. Any of the prior art processes which have been used to produce silica hydrogels over the past fifty years can be very effectively used. The important feature of the present processes is the exchange of most of the water in the silica hydrogel with an organic solvent to produce what is sometimes called a silica organogel, and the rapid fluid energy mill disintegration of this silica organogel. A fluid energy milled silica organogel has very different and distinct polyester resin thickening properties when compared to a fluid energy milled silica hydrogel.

A very useful technique for preparing useful silica hydrogels is set out in application Ser. No. 71,966 filed Sept. 14, 1970, now abandoned, of which I am a coinventer. This application sets out a general method for producing high pore volume silica hydrogels and gels. By high pore volumes is meant pore volumes in the range of 1.2-3 cc/g. In essence, this application discloses an alkaline gelation technique with closely adjusted concentrations of silica and silica/desolubilizing agent, ratio, pH ranges and temperature ranges. By such close control of the process parameters, distinctive characteristic silica products are produced. This process essentially consists of forming an alkali metal silicate solution wherein the silica is in a concentration of from about 3 to 15 percent, calculated as the $SiO_2$ content. To this solution is added a desolubilizing agent so as to produce a $SiO_2$/desolubilizing agent ratio of from about 2 to 20. This solution may be allowed to stand for from about 0.25 to 30 minutes, or it may be immediately utilized in the subsequent step of the process. In the subsequent step, the pH is adjusted to about 11.2 to 10.6 in order to form a silica hydrosol which converts on standing for about 1 to 15 minutes to a silica hydrogel. The silica hydrogel has a slurry consistency. This slurry may be aged from about 2 minutes to 120 minutes or longer at from 15° C. to 95° C., and the pH further adjusted to about 10 to 3 or lower to neutralize any remaining alkali ion followed by optional aging at from 15° C. to 95° C. for from 0.5 to 24 hours before washing and filtering. This silica material is washed essentially salt free using water or an acidified water solution, usually a sulfuric acid solution.

Any of the alkali metal silicates may be used in this process. These include the silicates and metasilicates of sodium and potassium. The desolubilizing agent added may serve various functions. The prime function is to form a more insoluble solvent for silica, and particularly when carbon dioxide is used to cause the gelation of the silicate solution. This allows formation of a silica hydrosol and gelation of this silica hydrosol at a higher pH, and further micelles which form in the presence of such an agent are less reactive with its neighbors, thus creating larger pore volumes. Ammonia and sodium sulfate are the preferred agents. Other agents which also create this insolubility and which may be used in place of the preferred ammonium hydroxide and sodium sulfate include the alcohols such as methanol, ethanol, propanols and glycols, ketones such as acetone and methyl ethyl ketone, and water soluble salts such as sodium chloride, calcium chloride, potassium chloride, potassium sulfate, ammonium sulfate and ammonium carbonate. Agents which raise pH, and which can be added in conjunction with the above insolubilizing agents, include the ammonium salts of weak acids such as ammonium carbonate. Essentially any material which is water soluble and which will decrease the solubility of silica in an alkali silicate solution can be used as the silica desolubilizing agent. What is important is the function provided by this agent, and that is that a silica hydrosol be capable of being formed and gelled in the pH range of 10.6 to 11.2.

In the gelation step an acid is added to lower the pH to the range of 11.2 to 10.6. Any suitable acid may be used, with sulfuric acid or carbon dioxide being preferred. Carbon dioxide in aqueous solution forms a carbonic acid. In the pH range of 11.2 to 10.6, the silicate/desolubilizing solution converts to a silica hydrosol which then sets to from a silica hydrogel. The final pH after completion of acid addition is usually above 10.6 Silica hydrosol formation and conversion to a silica hydrogel is usually carried out at ambient temperatures, although higher temperatures can be used. Generally higher temperatures reduce surface area and increase the average pore diameter. Overlap gelation has been found to be undesirable, that is, when fresh silica hydrosol is run in on an already set silica hydrogel slurry to form a continuous process.

After gelation, the silica hydrogel is aged for from 2 minutes to 2 hours or more at a temperature of 20° C. to 95° C. The silica hydrogel may be mixed during aging with the period of static aging not exceeding about 15 minutes. This time period of aging will in part be governed by the gelation set time. Gelation is a measure of silica polymerization, while the set time is the time for conversion of a silica hydrosol to a silica hydrogel and is a measure of the rate of silica polymerization. One purpose of aging is to control the surface area of the silica.

The following step consists of acid neutralization of alkali ions remaining in the silica hydrogel slurry. The pH is adjusted to about 10 or lower. A preferred pH is 9.5 when using carbon dioxide, but the pH may be lowered to about 3 when using sulfuric acid. Generally sulfuric acid or carbon dioxide is used for this neutralization, but other acids may be used. Other acids which may be used are hydrochloric acid, phosphoric acid, sulfurous acid and nitric acid, as well as organic acids. Further, various gaseous acid anhydrides which form acids in aqueous solutions may be used. After neutralization, the silica hydrogel slurry is optionally aged for 0.1 to 24 hours at 15° C. to 95° C., filtered and washed.

The washing consists of removing the salt reaction product from the silica hydrogel. This is conventionally a water or dilute acid wash and may be conducted by batch soaking, counter-current contacting, flow through a static column of hydrogel, or spraying with acidified water or water while the silica hydrogel is supported on a filter media. Any of these wash techniques will reduce the salt level of the silica hydrogel, usually sodium sulfates or carbonates, to the required low levels.

Essentially any pore volume silica from about 1.2 cc/g to 3.0 cc/g can be reproducibly made. It is only necessary to adjust the silicate concentration (percent $SiO_2$) and the $SiO_2$/coacervating agent ratio.

After the washing step, the silica hydrogel is in a condition to be treated by one of the essential process steps of my present invention. For simple exchange, the exchange, the hydrogel which still contains from 40-90 percent water is contacted with the organic water-displacing solvent. Essentially, any water miscible organic liquid can be used as the organic water-displacing solvent. Very useful solvents include acids such as formic acid and acetic acid, carbonyl compounds such as acetaldehyde, acetone and methyl ethyl ketone, and alcohols such as methanol, ethanol, isopropanol, ethylene glycol and propylene glycol, 1,4 butanediol, hexylenglycol, glycerol and ether glycols available under the tradenames Carbitol and Cellosolve. Actually any water miscible compound can be used, but these recited species illustrate the most commercially useful organic solvents. It is also considered within the practice of this invention to exchange the water miscible organic further with a water immiscible organic such as pentanes, hexanes, heptanes, cyclopentanes, cyclohexane, benzene, toluene, xylenes or similar organics. The mode of displacement of water may include simple batch contacting with mixing and/or heating. Further, the exchange can be conducted in column with a continual flow of organic solvent over the silica hydrogel, or the silica hydrogel can be moved countercurrent to the flowing organic solvent stream in the column. Any of these or other techniques would be very effective in effecting the exchange of the water in the silica hydrogel with the organic solvent. The organic solvent can then be regenerated by distillation and recycled.

Still another mode of exchange consists of azeotropic distillation for the removal of the water from the silica hydrogel. By this technique either binary or ternary, minimum or maximum boiling azeotropes can be formed. Further, the organic azeotroping solvents may be either miscible or immiscible with water in the liquid phase. A preferred method is to use water immiscible organic solvents since this facilitates recovery of the solvent. That is, when the azeotropic mixture is cooled it will form two distinct layers, one a water layer and the other a solvent layer. The solvent layer may then be recycled or dried and recycled. For water miscible azeotroping solvents, the recovery problem is more complex. However, a very efficient technique is to use zeolite A molecular sieve adsorbents to selectively adsorb water from the mixture. The organic solvent can then be recycled, and the zeolite adsorbent regenerated for subsequent reuse.

In actual use therefore, essentially any binary or ternary azeotroping systems can be used. These include the chlorocarbons such as carbon tetrachloride, chloroform, perchloroethylene, trichloroethylene and alcohols such as ethanol, n-propanol, and isopropanol.

The organic liquid or the exchange technique used in process is not a critical feature. What is important is that substantially all of the aqueous phase of the silica hydrogel be removed and replaced with an organic phase. A typical silica hydrogel contains about 65 to 80 percent by weight water with the remainder being silica. This water content must be reduced to less than about 15 percent by weight and preferably 10 percent, in order to produce a silica having unique thickening properties.

At this point, the silica organogel is in a condition to be fed to a fluid energy mill for concurrent drying (removal of solvent) and deaggregating. It is preferred to use fluid energy mills of the Jet Pulverizer, Micronizer, Jet-O-Mizer or Majac Mill types with a high temperature, high pressure gas feed. These fluid energy mills are all commercially available devices. A detailed account of fluid energy milling operations is set out in Perry's, Chemical Engineering Handbook, 4th Edition, McGraw-Hill Book Company, 1963, 8:42–43. U.S. Pat. No. 3,186,648 describes a preferred jet pulverizer. This fluid energy mill may be operated using essentially any high temperature and high pressure gaseous media such as air, nitrogen, steam or vaporized organic solvents. The silica particles which exit from the mill are dry and loosely aggregated in the size range of 0.5 to 5 microns. By loosely aggregated is meant that on mixing into an organic medium the aggregates readily break down to particles of less than about 100 millimicrons in size, and in many instances to the ultimate particle size of 10–30 millimicrons.

In more detail, the fluid energy mill is operated using a milling gas, preferably air or vaporized organic solvent, and particularly the vaporized exchange solvent at a temperature greater than the boiling point of the organic exchange solvent. Since the organic solvents will sometimes form minimum boiling azeotropes with water, any residual water in the pores of the silica will readily be removed in the drying step as an azeotrope in admixture with the remainder of the solvent. The upper limit of the temperature of the milling fluid is in the range of 600° C. The inlet nozzle milling gas pressures during milling may range from 30 psi to 300 psi. The internal milling pressure is in the range of about 0 to 30 psi. The preferred milling gas pressures are 80 psi to 250 psi, at a temperature of from 150° C. to 400° C.

In thickening applications, these loosely aggregated silicas are admixed into oils such as mineral oil or into resins such as polyester resins or silicone resins. These silica materials are added to be in a concentration of from 1–5 percent and preferably 2–3 percent by weight of the organic medium which it is to thicken. The silica is mixed with the organic medium by any conventional dispersing devices and techniques. Very useful devices are blenders such as the Waring Blender or a commercial disperser such as the Dispersator produced by the Premier Mill Co. These more dense particles do not readily deaggregate on being mixed into an organic medium and are thus not as good thickening agents.

The polyester resins which are very effectively thickened with this silica are those sold under the tradenames such as Paraplex (Rhon and Haas Co.), Reoplex (Geigy Ltd.), Niax (Union Carbide Corporation), Hexaplas (ICI Ltd.), or the GR resins of W. R. Grace & Co. These resins may be homopolyesters or copolyesters of the A-B or A-A/B-B types. These polyester resins are liquid and usually have a molecular weight in the range of about 1000–10,000. Most of these polyester materials are produced by the polycondensation of diols with dicarboxylic acids or dicarboxylic acid anhydride, thereby forming ester linkages in the polymer backbone. Exemplary of these diols are the glycols, such as ethylene and propylene glycol, 1,6 hexanediol and bisphenol. Exemplary of the dicarboxylic acids or acid anhydrides are phthalic, maleic and succinic acids and anhydrides. The commercial polyester resins usually contain quantities of polyenes such as poly(vinylacetates), poly(vinylchloride) or styrene to impart various properties to the set resin. However, regardless of the polyester resin system utilized, the silica products made by the present process are superior to those produced without the use of an organic exchange prior to fluid energy mill grinding.

The partially organic exchanged silica hydrogel fluid energy milled products of this invention give a significant improvement over fluid energy milled silica hydrogel without any prior organic exchange. The theoretical reasoning for this phenomenum is not yet fully known. It is theorized that there is a decreased silanol (SiOH) group population which may enhance the affinity of the silica surface for the organic medium which is to be thickened. This surface is mainly internal pore surface which is difficult to investigate. What is known, however, is that the rapid fluid energy mill grinding and drying (pore liquid removal) where the silica pore liquid is an organic liquid produces a silica having unique thickening properties.

The following examples are set out to further amplify the invention.

EXAMPLE 1

This example illustrates a procedure for producing a precursor silica using $H_2SO_4$ gelation.

An acid solution of 300 gm. $H_2SO_4$ in 1000 ml. of $H_2O$ is poured into a silicate solution which is made up from 2500 ml. sodium silicate (28 percent $SiO_2$ and 8.7 percent $Na_2O$), 3250 ml. $H_2O$ and 1750 ml. of 30 percent aqueous ammonium hydroxide. The pH of the resulting silica hydrosol was 10.95. The set time was about 6 minutes. The slurry is aged for 45 minutes, 30 minutes with agitation. This slurry is then blended in a Waring Blender neutralized by the addition of a sulfuric acid solution with complete neutralization at about pH 10. The slurry is then washed on a filter with 15 liters of hot water. The filter cake is then reslurried in 10 liters of water containing 125 ml. $H_2SO_4$ and filtered. This second filter cake is then washed with 15 liters of hot water adjusted to pH 3.0. This filter cake contains about 70 percent water and 30 percent silica.

EXAMPLE 2

This example illustrates a procedure for producing a precursor silica using carbon dioxide gelation.

A solution containing 1072 g. 40°Be sodium silicate, 172 g. of a 29 percent ammonium hydroxide solution and 1756 g. of water are thoroughly mixed to form a 3000 g. total solution. This solution contains 300 g. silica and 50 g. ammonia. This yields a silica concentration of 10 percent and silica/ammonia ratio of 6. Carbon dioxide is bubbled into this solution, reducing the pH to 10.91. The solution gels in 4–6 minutes. This silica hydrogel is aged for 50 minutes, 40 minutes being with agitation. Carbon dioxide is added over a period of about 1 hour until the pH reaches 9.5. Sulfuric acid is then added to neutralize the remaining alkali ion in the gelled silica. This silica hydrogel is then washed with 15 liters of hot water.

EXAMPLE 3

This example sets out a series of silica syntheses at various sodium silicate (silica) concentrations and $SiO_2/NH_3$ ratios. After washing, the silica hydrogel is mixed with sufficient acetone to reduce the water content to less than 10 percent by weight. Acetone is miscible with water and replaces water in the hydrogel structure. This exchanged silica is then fed to a fluid energy mill for concurrent drying and deaggregating.

The acetone exchange technique consists of slurrying 150 g. of washed silica hydrogel with 2 liters of acetone, removing excess acetone-water mixture by filtration, and washing on the filter with 2 liters acetone, reslurrying the silica with a second 2 liter portion of acetone, and removing any excess acetone-water mixture by filtration and washing on the filter with 2 liters acetone. The silica is then reslurried with 1 liter of acetone and fed to a jet pulverizer for deaggregating. The fluid energy mill is operated using air at 800° F. inlet temperature and 225 psig. The slurry is injected into the mill at 80° F. and 140 psig. The effluent silica is collected in a bag collector. Table I sets out the properties of the product.

Table I

| Formulation | | Pore | Surface | *Thickening - 2 RPM | |
|---|---|---|---|---|---|
| % $SiO_2$ | $SiO_2/NH_3$ Ratio | Volume ml/g | Area $m^2/g$ | 2% Mineral Oil | 2% Polyester |
| 5.5 | 2 | 2.30 | 311 | 17.650 | 2,900 |
| 6.0 | 3 | 2.40 | 719 | 21,150 | 2,500 |
| 6.5 | 3 | 2.60 | 566 | 21,000 | 2,000 |
| 6.5 | 3 | 2.65 | 616 | 24,400 | 2,500 |
| 6.5 | 3 | 2.55 | 473 | 24,750 | 3,100 |
| 6.5 | 3 | 2.50 | 587 | 23,125 | 2,775 |
| 7.0 | 3 | 2.70 | 593 | 21,000 | 2,250 |
| 7.0 | 6 | 2.67 | 331 | 15,650 | 2,550 |
| 7.5 | 3 | 2.60 | 547 | 24,200 | 2,600 |
| 8.0 | 3 | 2.45 | 517 | 22,600 | 2,350 |
| 9.0 | 3 | 2.80 | 527 | 19,800 | 2,000 |

Table I-continued

| Formulation | | Pore | Surface | *Thickening - 2 RPM | |
|---|---|---|---|---|---|
| % $SiO_2$ | $SiO_2/NH_3$ Ratio | Volume ml/g | Area $m^2/g$ | 2% Mineral Oil | 2% Polyester |
| 9.0 | 12 | 2.75 | 301 | 13,750 | 1,950 |

*Thickening of NUJOL mineral oil at 25° C. with 2 percent silica mixed using a blender. The polyester resin is GR-28 V, available from the Marco Chemical Division of W.R. Grace & Co. resin which contains 49 percent styrene. The thickening values are obtained on a Brookfield RUF Viscometer at 2 RPM.

It has been found that for thickening applications the formulation should be in the range of 6 percent to 8 percent silica by weight and have a silica/$NH_3$ ratio of about 3. As either of these variables are varied beyond these values, there is a decrease in thickening, with the extremes of these values producing markedly decreased thickening values.

EXAMPLE 4

This example sets out in comparison silica products wherein the acetone exchange is deleted with the aqueous silica slurry fed directly to a jet pulverizer. Table II sets out the values for thickening of mineral oil and polyesters.

Table II

| Formulation | | Pore | Surface | *Thickening-2 RPM | |
|---|---|---|---|---|---|
| % $SiO_2$ | $SiO_2/NH_3$ Ratio | Volume ml/g | Area $m^2/g$ | 3% Mineral Oil | 2% Polyester |
| 6.5 | 3 | 1.70 | 417 | 19,000 | 1,650 |
| 7.0 | 3 | 2.10 | 274 | 21,500 | 1,700 |
| 7.5 | 3 | 2.25 | 189 | 17,000 | 1,650 |
| 8.5 | 3 | 2.90 | 318 | 10,250 | 750 |
| 9.0 | 3 | 2.80 | 280 | 9,450 | 500 |
| 9.5 | 3 | 2.37 | 358 | 7,150 | 550 |
| 10.0 | 3 | 1.85 | 272 | 5,200 | 500 |
| 10.0 | 3 | 1.75 | 448 | 4,450 | 500 |

*Same mineral oil, polyester resins and procedure as in Example 3.

In a comparison with the data of Table I, it is evident that an exchange of the water in the silica prior to drying and deagglomerating increases the thickening ability in both mineral oil and polyester resin. This effect, however, is more pronounced in polyester resin than in mineral oil. As in Example III, it has also been found that the best thickening values result when the silica concentration is between about 6 percent to 8 percent and the $SiO_2/NH_3$ ratio is maintained at 3 for a comparison of the preferred ratios.

EXAMPLE 5

This example sets out a series of runs where the silica hydrogel after washing is first mixed with sufficient acetone to reduce the water content to less than 5 percent by weight, followed by a mixing with n-hexane which reduces the acetone content to less that 10 percent by weight. This n-hexane exchanged silica is then fed to the fluid energy mill as a slurry for concurrent drying and deaggregating. Table III sets out properties of the silica and its properties in thickening mineral oil and polyester resin.

Table III

| Formulation | | Pore | Surface | *Thickening - 2 RPM | |
|---|---|---|---|---|---|
| % $SiO_2$ | $SiO_2/NH_3$ Ratio | Volume ml/g | Area $m^2/g$ | 2% Mineral Oil | 2% Polyester |
| 6.5 | 3 | 1.5 | 255 | 17,375 | 2,250 |
| 6.5 | 3 | 1.5 | 255 | 14,700 | 1,500 |
| 6.0 | 3 | 2.85 | 698 | 20,600 | 2,500 |
| 6.5 | 3 | 2.5 | 573 | 22,775 | 1,950 |

Table III-continued

| Formulation | | Pore Volume ml/g | Surface Area m²/g | *Thickening - 2 RPM | |
|---|---|---|---|---|---|
| % SiO₂ | SiO₂/NH₃ Ratio | | | 2% Mineral Oil | 2% Polyester |
| 7.0 | 3 | 2.90 | 698 | 16,800 | 2,825 |

*The same mineral oil, polyester resin and procedure as in Example III.

From these runs it is evident that there is no clear advantage other than to use a less volatile solvent in the removing of acetone and replacing it with a solvent immiscible with water. Such solvents are usually characterized as having a very low hydrogen bonding capability with water.

What is claimed is:

1. A process for preparing a thickening grade of silica comprising
   forming an alkali silicate solution having a definite silica concentration and a water soluble silica desolubilizing agent concentration;
   adding an acid to reduce the pH to about 11.2 to 10.6, thereby forming a silica hydrosol which converts to a silica hydrogel within about 1 to 15 minutes;
   aging the silica hydrogel for about 2 to 120 at 20° C. to 95° C. minutes;
   neutralizing said silica hydrogel by adding an acid to reduce the pH to about 10 to 3;
   washing and recovering a porous silica hydrogel;
   reducing the water content of said porous silica hydrogel to less than about 15 percent by weight by exchange with a water miscible organic liquid to form an organic loaded porous silica;
   feeding said organic loaded porous silica to a fluid energy mill for concurrent drying and deaggregation; and
   recovering said thickening grade of silica.

2. A process as in claim 1 wherein after neutralizing and prior to washing, said silica is aged for 0.1 to 24 hours at 15° to 95° C.

3. A process as in claim 1 wherein said desolubilizing agent is selected from the group consisting of sodium sulfate and ammonia.

4. A process as in claim 3 wherein the silica concentration in said alkali silicate solution is in the range of from about 3 to 15 percent calculated as silica, said desolubilizing agent being in a concentration to yield a silica to desolubilizing agent ratio of about 2 to 20.

5. A process as in claim 4 wherein the water content of said porous silica hydrogel is reduced to less than about 15 percent by weight by being replaced with an organic water miscible liquid selected from the group consisting of acetone, methyl ethyl ketone, methanol, ethanol, isopropanol, ethylene glycol, propylene glycol and mixtures thereof.

6. A process as in claim 5 wherein said replacing is by contacting said porous silica hydrogel with said water miscible organic solvent, with removal of excess water loaded organic solvent.

7. A process as in claim 6 wherein the water content of said porous silica hydrogel is reduced to less than about 10 percent by weight.

8. A process as in claim 5 wherein said replacing is by azeotropicaly distilling said porous silica hydrogel with said organic liquid.

9. A process as in claim 8 wherein the water content of said porous silica hydrogel is reduced to less than 10 percent by weight.

10. A process as in claim 5 wherein said fluid energy mill is operated using a milling fluid at a temperature greater than the boiling point of the liquid to be removed, and at a pressure greater than 50 psi.

11. A process as in claim 10 wherein said milling fluid is selected from the group consisting of air, steam, nitrogen, vaporized organic liquids and mixtures thereof.

12. A process as in claim 11 wherein said milling fluid is selected from the group consisting of air and the vaporized organic exchange liquid.

13. A process as in claim 12 wherein greater than 95 percent of the water content of said porous silica hydrogel is replaced with an organic liquid.

14. A process for thickening mineral oil comprising admixing from about 0.5 percent to 5 percent by weight of the silica product of claim 13 to said mineral oil.

15. A process for thickening polyester resin comprising admixing from about 0.5 percent to 5 percent by weight of the silica product of claim 13 to said polyester resin.

* * * * *